(No Model.)
A. O. COLLIER.
VARIABLE DRIVING GEAR.
No. 549,442. Patented Nov. 5, 1895.
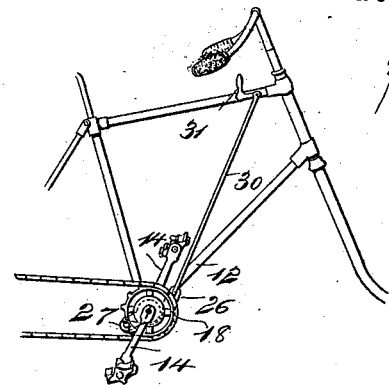
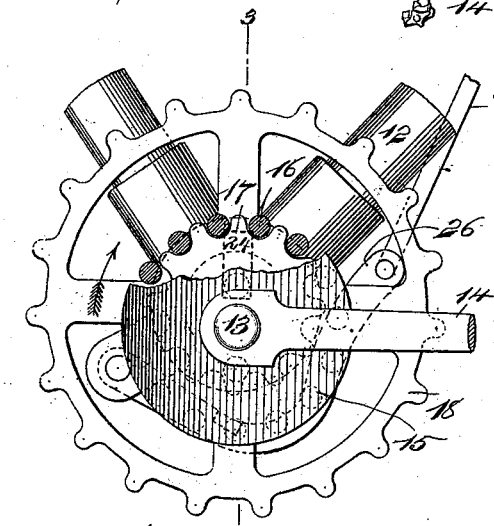
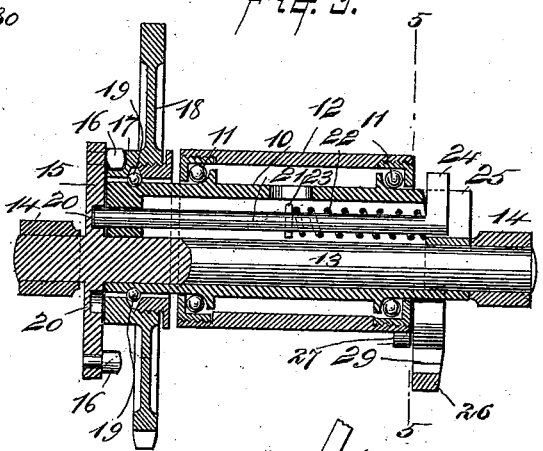
WITNESSES:
William Goebel
W. P. Hutchinson
INVENTOR
A. O. Collier
BY
Munn & Co
ATTORNEYS.

UNITED STATES PATENT OFFICE.

ARTHUR O. COLLIER, OF MANCHESTER, ENGLAND.

VARIABLE DRIVING-GEAR.

SPECIFICATION forming part of Letters Patent No. 549,442, dated November 5, 1895.

Application filed May 2, 1894. Serial No. 509,743. (No model.)

*To all whom it may concern:*

Be it known that I, ARTHUR O. COLLIER, of Manchester, England, have invented a new and Improved Variable Driving-Gear, of which the following is a specification.

This invention relates to an improvement on the two-speed driving mechanism for bicycles, tricycles, and other velocipedes, for which British Letters Patent were granted to Septimus John Collier, dated May 29, 1889, No. 8,893.

The object of the present invention is to remedy the defects inherent in the mechanism constructed as therein described. These defects will be apparent from the following considerations: The mechanism, as described in the said patent, was so constructed that when "geared down" for power the wheels worked as toothed gear-wheels and the bearing of the sprocket-wheel was subjected to the greatest racking strain at the time when the hardest work was to be done, while when the mechanism was in the normal position— *i. e.*, "geared up" for speed—the wheels were locked in engagement as clutches. Furthermore, when the locking-bolt was retracted, in order to gear down the mechanism for power while the machine was running, the pedals were liable to fly back so suddenly as to dislodge the feet of the rider therefrom just at the moment when the rider was applying extra force to the pedals in order to surmount the obstacle for which the slower gear is employed. Now according to my improved construction I remedy the first-mentioned defect by reversing the relative positions of the internal and external toothed wheels—that is to say, by mounting the internal toothed wheel on the pedal axle and making the external toothed pinion fast on the sprocket-wheel, so as to reverse the results obtained in the two positions of the mechanism. In other words, when in the normal geared-up position for speed the wheels mesh and run together as gear-wheels, while when geared down for power they interlock like clutches. The defect of the pedals being liable to fly back and dislodge the rider's feet when the change from "speed" to "power" is made is also obviated by this reorganization of the mechanism.

Reference is to be had to the accompanying drawings, forming a part of this specification, in which similar figures of reference indicate corresponding parts in all the views.

Figure 1 is a side elevation of my improved driving-gear as applied to a bicycle. Fig. 2 is a broken enlarged side elevation showing the gear more in detail. Fig. 3 is a longitudinal section on the line 3 3 of Fig. 2. Fig. 4 is a plan view of the gear, and Fig. 5 is a cross-section on the line 5 5 of Fig. 3.

The driving mechanism comprises a hollow axle 10, mounted in the ordinary ball-bearings 11 in the frame 12 and bored eccentrically and longitudinally, so as to receive the crank-shaft 13, which extends through the axle, and is provided at the ends with the customary cranks 14, having the usual pedals thereon. The crank-shaft has secured to it a stud-wheel 15, which has near its periphery and on one side studs 16, adapted to act as an internal toothed wheel in engagement with the external toothed pinion 17 on the hub of the sprocket-wheel 18, which sprocket-wheel is adapted to carry the usual drive-chain and is mounted on ball-bearings 19 on the axle 10.

At diametrically-opposite points of the stud-wheel 15 and on a diameter at right angles to the cranks are holes 20, which are adapted to receive the end of the locking-bolt 21, which moves longitudinally through the axle 10 parallel with the crank-shaft, two holes being provided to avoid lost motion by insuring a quicker engagement of the bolt with the stud-wheel when the mechanism is to be geared down for power.

The bolt 21 is pressed toward the stud-wheel by a spring 22, which presses against a lug or pin 23 on the locking-bolt and against the inner end of the axle 10. The other end of the locking-bolt has a lug 24, which slides in a slot 25 in the axle 10, and this lug is adapted to be acted on by a cam-face or inclined surface formed on a lever 26 in order to disengage the bolt from the stud-wheel 15.

The lever 26 is pivoted on the lug 27 on the main frame or casing of the axle and it is provided on its outer face with an inclined cam 28. The thin end of this lever, which is the end opposite to the pivoted end, is adapted to enter between the lug 24 and the adjacent casing, so that when the lug 24, revolving with the axle 10, encounters the cam-face 28 the bolt 21 will be retracted. In the inclined face of the lever is a notch 29, which is adapted to engage and hold the lug 24 after the bolt 21 has been completely retracted by the lug 24 riding up the cam-face 28. This arrangement also locks the axle 10 to the main frame, so as to prevent the axle from turning. The lever 26 is pivoted to a connecting-rod 30, which extends upward and is pivoted to a tilting hand-lever 31 on the upper part of the frame 12 and within easy reach of the rider, so that by manipulating the lever 31 the lever 26 may be raised or lowered. The lever 26 extends from its pivot 27 beneath the axle 10 in the opposite direction to the direction of revolution of the cranks, so that the lug 24 of bolt 21 approaches it at its thin end, to which rod 30 is connected, so that the lug 24 comes against the cam-face directly without first passing under the lever and oscillating it on its pivot, as in the arrangement described in the English patent aforesaid.

When the crank-shaft 13 is turned and the bolt 21 is held in its normal vertical position by the notch 29, the axle 10 is locked to the frame by the engagement of lug 24 in notch 29, and consequently the axle 10 is prevented from turning and the movement is imparted to the sprocket-wheel by the stud-wheel 15, gearing as an internal toothed wheel with the pinion 17, and consequently the rate of speed of the sprocket-wheel 18 is greater than that of the pedals; but when the lever 26 is moved out of operative position, so as to disengage the lug 24 from the notch 29, the bolt 21 is forced by its spring 23 into engagement with one of the holes 20 in the stud-wheel 15, so that the pedal-shaft 13, stud-wheel 15, axle 10, and sprocket-wheel 18 all turn together with the axle 10 as a center, and consequently the sprocket-wheel turns at the same speed as the pedals.

Having thus described my invention, what I claim as new, and desire to secure by Letters Patent, is—

1. In a two-speed driving mechanism for velocipedes, comprising a pedal shaft journaled eccentrically in a hollow axle, the axle journaled in the frame, a chain sprocket wheel journaled concentrically upon the said axle, and a locking bolt adapted either to lock the axle to the frame so that it forms a stationary bearing for the pedal shaft and sprocket wheel, or to lock the axle to the pedal shaft so that it revolves as one therewith and with the sprocket wheel; the combination of the internal toothed wheel mounted fast upon the pedal shaft, and the external toothed pinion mounted fast on the sprocket wheel whereby the said wheels mesh and run as gear wheels when the mechanism is geared up for speed, and engage as clutches when the mechanism is geared down for power, substantially as specified.

2. A two-speed driving mechanism for velocipedes, consisting in the combination of a pedal shaft journaled eccentrically in an axle, an axle journaled in the frame, a sprocket wheel journaled concentrically upon the said axle, an internal toothed gear wheel fast on the pedal shaft, an external toothed pinion fast on the sprocket wheel and in gear with the internal wheel, a spring pressed bolt sliding longitudinally in the axle and adapted to engage at one end with a hole in the internal toothed wheel, a lug on the other end of said bolt, an arm pivoted to the frame and having a cam face adapted to be interposed in the path of the said lug so as to act thereon to disengage the bolt from the internal toothed wheel, and a notch in said arm adapted to engage the lug after the bolt has been so retracted and to thereby lock the axle to the frame so that it forms a bearing for the crank axle and sprocket wheel, substantially as specified.

3. The combination, with the hollow axle, its support, the sprocket wheel thereon, the crank shaft journaled eccentrically in the axle, and the apertured stud wheel carried by the crank shaft and geared to the sprocket wheel; of the spring-pressed slide bolt having a lug at one end, the swinging lever fulcrumed on the support of the hollow axle and provided with an inclined cam face adapted to act on the lug of the slide bolt, and notched to engage therewith, and mechanism for moving the lever, substantially as described.

ARTHUR O. COLLIER.

Witnesses:
F. W. HANAFORD,
C. SEDGWICK.